United States Patent
Lynch

(10) Patent No.: US 7,207,295 B2
(45) Date of Patent: Apr. 24, 2007

(54) TRANSPORT AND FITTING STAND

(75) Inventor: John P. Lynch, Burbank, SD (US)

(73) Assignee: Sydell Incorporated, Burbank, SD (US)

( * ) Notice: Subject to any disclaimer, the term of this patent is extended or adjusted under 35 U.S.C. 154(b) by 0 days.

(21) Appl. No.: 11/326,641

(22) Filed: Jan. 6, 2006

(65) Prior Publication Data

US 2006/0112902 A1 Jun. 1, 2006

Related U.S. Application Data

(62) Division of application No. 11/031,753, filed on Jan. 7, 2005, now Pat. No. 7,013,839.

(60) Provisional application No. 60/539,359, filed on Jan. 27, 2004.

(51) Int. Cl.
*A01K 15/00* (2006.01)
(52) U.S. Cl. ............................ 119/756; 119/753
(58) Field of Classification Search ............. 119/753, 119/755, 756, 757, 712, 722, 724, 723, 848; 280/651, 652, 47.34; 414/471, 474, 476, 414/495
See application file for complete search history.

(56) References Cited

U.S. PATENT DOCUMENTS

| 865,987 | A | 9/1907 | Barlow |
| 2,617,547 | A | 11/1952 | Pridy |
| 3,786,951 | A | 1/1974 | Ruff et al. |
| 3,931,895 | A | 1/1976 | Grimaldo |
| 5,118,245 | A | 6/1992 | Dunkel |
| 5,275,526 | A | 1/1994 | Moseley |
| 6,889,998 | B2 | 5/2005 | Sterns et al. |

OTHER PUBLICATIONS

"Products—Category: Fitting Stands," *Sydell, Inc.*, http://www.sydell.com/products.asp?id=27&title=Fitting Stands, 3 pages (Date: Publicly known prior to the filing date of the present application).

*Primary Examiner*—T. Nguyen
(74) *Attorney, Agent, or Firm*—Merchant & Gould P.C.

(57) ABSTRACT

A method of using a fitting stand including a frame arrangement, a platform, and a wheel arrangement. The wheel arrangement includes front and rear wheel assemblies. The frame arrangement is configured to pivot the platform between a lowered position and a raised position. In the lowered position, a base frame of the frame arrangement is lifted from the ground such that the only the front and rear wheel assemblies contact the ground to provide transportation of the fitting stand when either loaded or unloaded. In the raised position, legs of the frame arrangement contact the ground such that the front and rear wheel assemblies are lifted off the ground.

3 Claims, 5 Drawing Sheets

TRANSPORT AND FITTING STAND

CROSS-REFERENCE TO RELATED APPLICATIONS

This application is a divisional application of U.S. application Ser. No. 11/031,753, filed Jan. 7, 2005 now U.S. Pat. No. 7,031,839; which application claims the benefit of U.S. Provisional Application No. 60/539,359, filed Jan. 27, 2004; which applications are incorporated herein by reference.

TECHNICAL FIELD

This disclosure relates generally to methods and equipment for use in the farming and livestock industry. More particularly, this disclosure relates to a fitting stand for use with livestock.

BACKGROUND

Fitting stands (otherwise known as trimming, grooming, or show stands) are used in the livestock industry for maintenance or show of animals. Such animals can include, for example, sheep, goats, swine, dogs or other animals or livestock. For show of an animal, a fitting stand is used to raise the animal to a height that provides better access to the animal for grooming and judging of the animal at livestock competitions, for example. For maintenance of an animal, a fitting stand is used to raise the animal to a height that provides better access to the animal for milking or shearing, or better access to the animal during veterinarian check-ups, for example.

Use of conventional fitting stands require that the animal be brought to the location of the fitting stand. The animal is then placed upon the stand, and the stand is raised to a position that provides easy access to the animal for maintenance or show of the animal. These stands are configured to accommodate the weight of some rather large animals; and are accordingly heavy to lift or transport. Some conventional fitting stands include front wheels at one end so that the opposite end of the stand can be lifted or tilted upward. The tilted stand can then be rolled on the front wheels to various locations. The animal must still, however, be brought to the working or showing location at which the stand is located. That is, the stand cannot be transported to the animal, loaded, and then transported to the working location while the animal is loaded on the stand.

In general, improvement has been sought with respect to such arrangements, generally to better accommodate ease of use of the device and ease of transporting, and maintaining or showing animals.

SUMMARY

In one aspect, the present invention relates to a fitting stand. The fitting stand includes a frame arrangement, a platform attached to the frame arrangement, and a wheel arrangement. The platform is selectively pivotable between a lowered position and a raised position. The wheel arrangement includes front and rear wheels assemblies, and is arranged to transport the fitting stand when the platform is in the lowered position.

In another aspect, the present invention relates to a method of using a fitting stand, the fitting stand including a platform coupled to a frame arrangement and a wheel arrangement. The method includes loading an animal onto the platform of the fitting stand, transporting the animal on the platform of the fitting stand to a desired location, and raising the platform of the fitting stand to a raised position.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to various features of the present disclosure that are illustrated in the accompanying drawings. Wherever possible, the same reference numbers will be used throughout the drawings to refer to the same or like parts.

Figure 1:
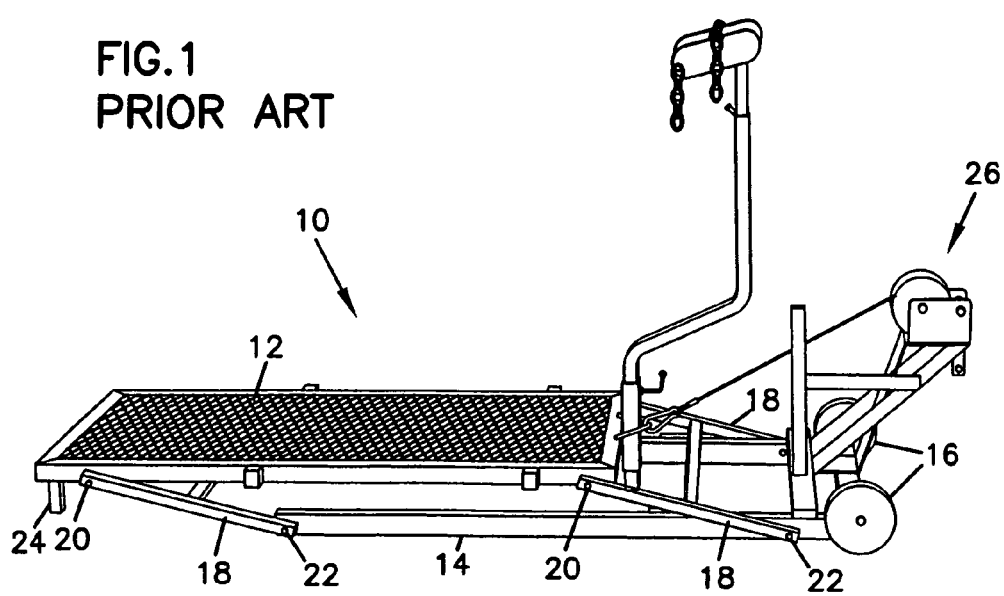
FIG. 1 is side perspective view of a prior art fitting stand, shown in a lowered position.
Figure 2:
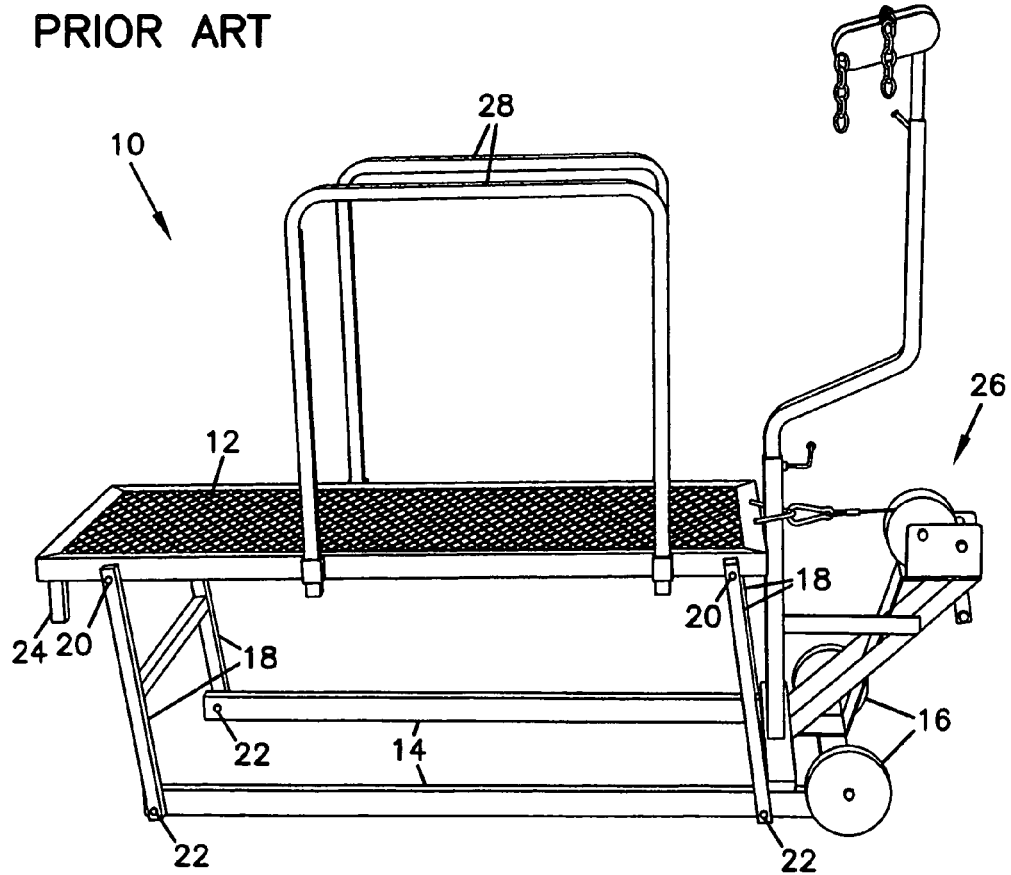
FIG. 2 is a side perspective view of the prior art fitting stand of FIG. 1, shown with sides, and shown in a raised position.

Referring to FIGS. 1 and 2, a conventional fitting stand 10 is illustrated. The stand 10 has a platform 12 that is mounted to a frame 14. Wheels 16 are coupled to the frame 14 adjacent to the front of the stand. The wheels 16 are provided for transport of the stand, as will be described hereinafter.

The platform 12 is mounted to the frame 14 by legs 18 having a first end 20 and a second opposite end 22. The first ends 20 of the legs 18 are pivotally coupled to the platform 12. The second opposite ends 22 of the legs 18 are pivotally coupled to the frame 14. In use, an animal is loaded onto the platform 12 when the platform is in a lower position, as shown in FIG. 1. Stub legs 24 attached to the platform 12 function as stops to maintain a horizontal orientation of the platform when the animal steps onto the platform. A power unit 26 is used to raise the platform 12 to the raised position, as shown in FIG. 2. In particular, the platform is pull by the power unit 26 such that the legs 18 pivot relative to the frame 14 from the lower position to the raised position. In the raised position, the stand 10 rests upon frame 14 to which the second ends 22 of the legs 18 are attached. Sides 28 (FIG. 2) may be attached to the platform 12 to assist in containing the animal upon the platform.

To transport the conventional fitting stand 10 of FIGS. 1 and 2, the stand is positioned in the lowered position (FIG. 1). The rear of the stand (i.e. the platform) is then lifted and tilted upward so that only the wheels 16 contact the ground. The stand can then be carried/pushed to a particular location. As can be understood, the convention stand 10 is not designed for "loaded" transport. That is, with the platform tilted, the stand cannot easily or safely be transported with an animal loaded on the platform 12. In addition, the weight of an animal upon the platform would make lifting and tilting the stand difficult.

FIGS. 3–8 illustrate a transport and fitting stand 100 having features that are examples of how inventive aspects in accordance with the principles of the present disclosure may be practiced. Preferred features are adapted for providing transport of an animal as well as lift of the animal.

Figure 3:
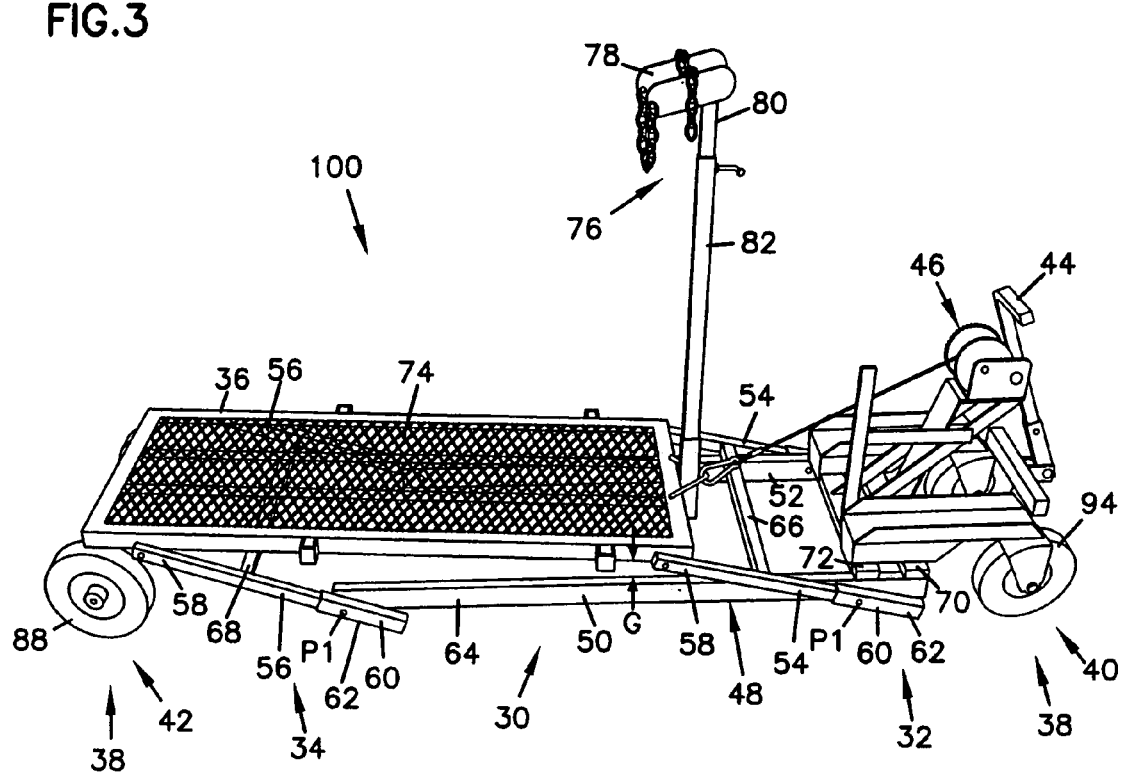
FIG. 3 is a side perspective view of one embodiment of a transport and fitting stand, shown in a lower position, according to the principle of the present disclosure.

Referring to FIG. 3, the transport and fitting stand 100 generally includes a frame arrangement 30 having generally a front 32 and a back 34. A deck or platform 36 is attached to the frame arrangement 100. The stand 10 also has a wheel arrangement 38, including a front wheel assembly 40 and a rear wheel assembly 42. A handle 44 is provided for transport of the stand 100, and for transport of an animal positioned upon the platform 36 of the stand 100. In addition, the stand 100 includes a power unit 46 for raising and lowering the platform 36 of the stand 100.

The frame arrangement 30 includes a base frame 48 having first and second frame members 50, 52. The first and second frame members 50, 52 are generally parallel to one another. The platform 36 is mounted to the frame members 50, 52 by front legs 54 and rear legs 56 of the frame arrangement 30. Each of the front and rear legs 54, 56 has a first end 58 and a second opposite end 60. The first ends 58 of each of the front and rear legs 54, 56 are pivotally coupled to the platform 36, and the second ends 60 of each of the front and rear legs are pivotally coupled to the base frame 48. In the preferred embodiment, the second ends 60 of the front and rear legs 54, 56 are pivotally connected to an outer side 64 of the first and second frame members 50, 52 of the base frame 48.

As shown in FIG. 3, each of the front and rear legs 54, 56 is pivotally coupled to the base frame 48 at a location P1 between the first and second ends 58, 60 of each of the legs. That is, a portion or extension 62 of each of the legs extends beyond the location P1 at which the legs 54, 56 pivotally couple to the base frame 48. In the illustrated embodiment, the extensions 62 of each leg are removable pieces. The removable extension pieces are designed so that a user can retrofit a conventional stand, such as the stand shown in FIGS. 1 and 2, with extensions of the present disclosure. It is contemplated that the extensions 62 may also be an integral extension of each of the legs 54, 56.

Still referring to FIG. 3, the front legs 54 are interconnected to one another by a first cross-support member 66. Likewise, the rear legs 56 are interconnected to one another by a second cross-support member 68. Each of the first and second cross-support members 66, 68 are generally oriented perpendicular to the first and second frame members 50, 52 of the base frame 48. The first and second cross-support members 66, 68 provide structural support to stabilize the stand 100 when positioned in the raised position. In addition, as will be described in greater detail hereinafter, the first cross-support member acts 66 as a lever to orient the frame arrangement 30 such that the stand 100 can be transported in the lower position when the platform is either loaded or unloaded.

The frame arrangement 30 also includes first and second transverse support members 70, 72. The transverse support members 70, 72 extend between the first and second frame members 50, 52 adjacent to the front 32 of the frame arrangement 30. The transverse support members 70, 72 support the power unit 46 and the front wheel assembly 40 of the stand 100.

In one non-limiting embodiment, the frame arrangement 30, including the base frame 48, the transverse support members 70, 72, the legs 54, 56 and cross-support members 66, 68 are constructed of tubular steel, such as rectangular steel tubing. Other constructions can be used to provide the frame arrangement in accord with the principles disclosed. Also, in the illustrated embodiment, the platform 36 is constructed of a mesh structure 74. The mesh structure 74 provides a non-slip surface upon which the animals stand, and also permits dirt or spills to fall through the mesh structure 74 so that clean up of the stand 100 is easier. Non-mesh deck regions can also be used.

Still referring to FIG. 3, a neck reach 76 is affixed to the platform 36. The neck reach 76 is used to retain the animal on the platform. In the illustrated embodiment, the neck reach is adjustable to adapt to the varying sizes of animals, and different animals. In particular, the neck reach 76 includes a head harness 78 coupled to an extension portion 80, and a sleeve 82. Raising or lowering the extension portion 80 within the sleeve 82 to a desired position adjusts the height of the head harness 78 of the neck reach 76. In an alternative embodiment, the fitting stand 100 may be used without a neck reach 76. For example, the stand may be used during veterinarian examinations during which the animal lays upon the platform without being harnessed to the neck reach 76. Accordingly, the neck reach 76 can be detachable to accommodate such applications.

Figure 4:
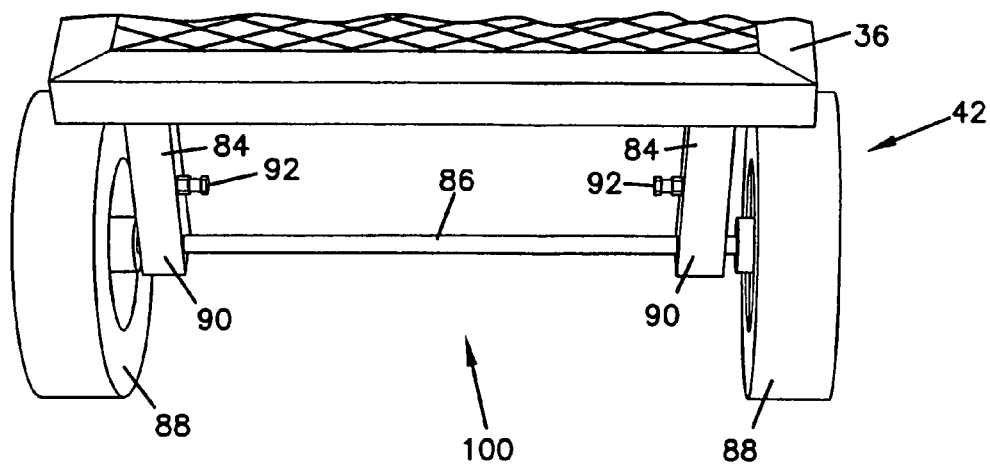
FIG. 4 is a rear perspective view of the transport and fitting stand of FIG. 3.

Referring now to FIG. 4, the rear wheel assembly 42 of the wheel arrangement 38 is coupled to the platform 36. The rear wheel assembly 42 includes extensions 84 that interconnect to the platform. Each of the extensions 84 has a hole (not shown) that extends through the extension for receipt of an axle 86. Rear wheels 88 are attached to the axle 86. In one embodiment, the extensions 84 may be welded or secured directly to the platform 36. In the illustrated embodiment, the extensions 84 are sleeves 90 configured to fit over stub legs (e.g., 24 of FIG. 1) of existing platforms. The sleeves 90 are designed so that a user can retrofit a conventional stand, such as the stand shown in FIGS. 1 and 2, with the rear wheel assembly 42 of the present disclosure. In particular, the sleeves 90 (FIG. 4) can be secured to the stub legs 24 of the conventional stand by fasteners 92, such as set screws or other fastening devices.

Figure 6:
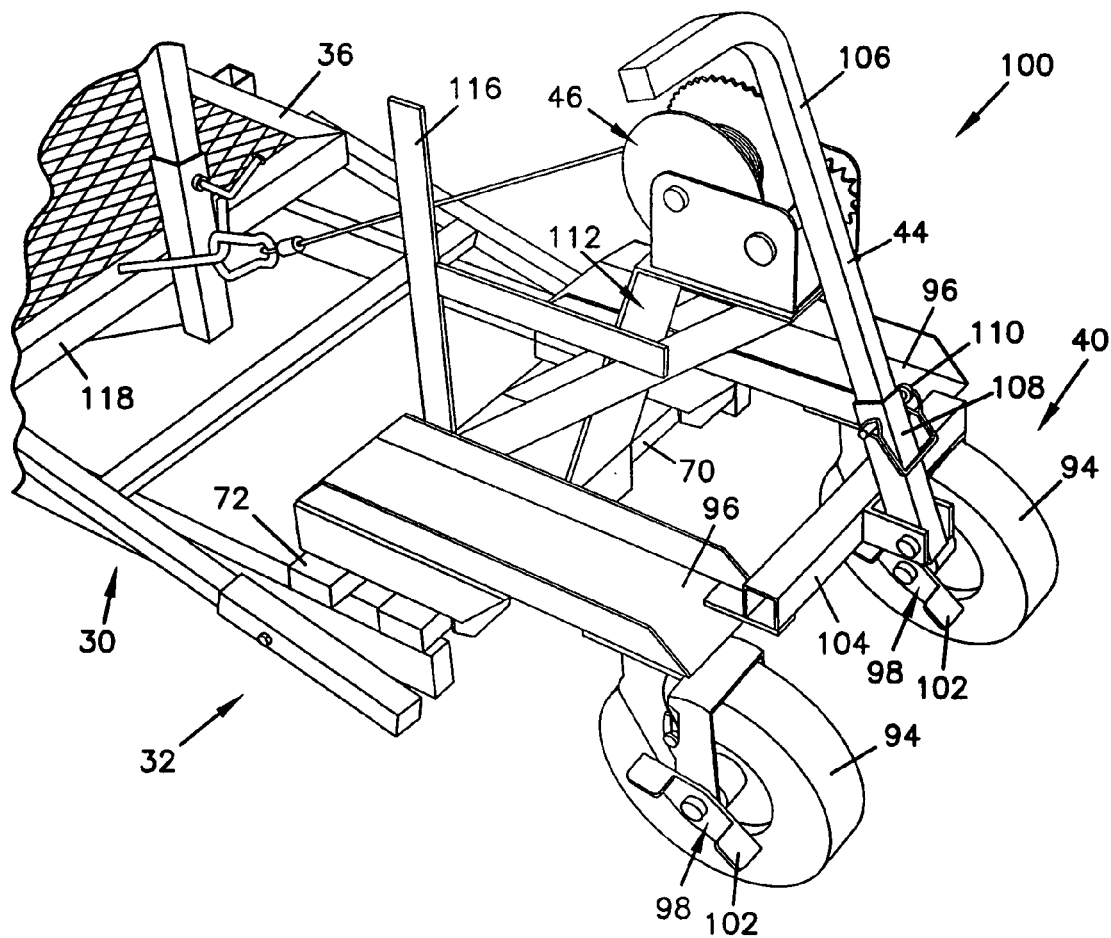
FIG. 6 is a front perspective view of the transport and fitting stand of FIG. 3.

Referring now to FIG. 6, the power unit 46 and front wheel assembly 40 are located adjacent to the front 32 of the frame arrangement 30. The front wheel assembly 40 includes front wheels 94 coupled to wheel mounting brackets 96. The wheel mounting brackets 96 are secured to the first and second transverse support members 70, 72. The front wheels 94 in the illustrated embodiment are swiveling caster wheels sized to withstand the weight of an animal standing upon the platform of the stand. The swiveling caster wheels rotate or swivel to permit a user to steer the front of the stand 100 by selectively providing hand pressure to either the right side or left side of the stand via the handle 44. Other types of wheels, such as non-swiveling casters or wheels may be used. In one embodiment, the front wheel assembly 94 can be sized and configured to retrofit to a frame of a conventional stand 10 in combination with the rear wheel assembly 42.

The front wheels 94 include brakes 98 that can be applied or engaged to maintain the stand in a stationary position while loading the platform 36, for example. In the illustrated embodiment, the brakes 98 are engaged and disengaged by a foot lever 102. Other braking arrangements, such as hand-actuated braking assemblies can also be used. In addition, rear wheel brakes can be used in place of, or in combination with, the brakes 98 of the front wheels 94.

Still referring to FIG. 6, a third transverse member 104 is coupled to each of the wheel mounting brackets 96. The third transverse support member 104 provides structural stability to the front wheel assembly 40 and provides an attachment location for the handle 44. The handle 44 can include a variety of handle or tongue configurations. In the illustrated embodiment, the handle 44 is an adjustable handle having a handle shaft 106 that slides within a handle sleeve 108. The handle shaft 106 is secured in a selected position by a fastener 110, such as a cotter pin, bolt, or setscrew for example.

The power unit 46 of the stand 100 is provided to raise and lower the platform of the stand. The power unit 46 is coupled to a Z-brace or support structure 112, which in turn is interconnected to the first and second transverse support members 70, 72. In the illustrated embodiment, the power unit 46 is a winch device that attaches to the front of the platform 36 to pull the platform from the lowered position to the raised position, and lower the platform from the raised position to the lowered position.

In the illustrated embodiment, the support structure includes a vertical stop member 116. The vertical stop member 116 limits the motion of the platform 36 when being raised from the lower position to the raised position. That is, a front structure 118 of the platform 36 contacts the vertical stop member 116 to prevent the platform 36 from rotating toward the power unit 26 beyond a particular raised position. In other embodiments that have a platform height greater than that of the vertical stop member 116, a cross-bar (not shown) may be positioned to extend between the front legs 54 to contact the vertical stop member 116 to prevent over-rotation of the front legs 54 and the platform 36.

Referring back to FIG. 3, in use, the stand 100 may be transported (e.g. wheeled or rolled) in the lowered position to a particular location to load an animal. In the lowered position, the extensions 62 of the legs 54, 56 do not interfere with the ground so that the stand 100 can be freely transported. That is, the height of the front and rear wheels 94, 88 cooperatively relate to the length of the extensions 62 to provide free movement of the stand 100.

In addition, in the lowered position, the base frame 48 also does not interfere with the ground. Referring now to the schematic representation of the stand 100 of FIG. 8, when the platform 36 is lowered, the weight of the platform 36 places a downward force F1 on the legs 54, 56 at pivot locations P2. The downward force F1 causes the legs 54, 56 to pivot such that the first cross-support member 66 (FIG. 3) contacts the first and second frame members 50, 52 of the base frame 48 at contact points C (only one shown in FIGS. 5 and 8). The contact points C between the first cross-support member 66 and the frame members 50, 52 acts a fulcrum to lift the base frame 48 upward. That is, the downward force F1 and the fulcrum create a corresponding upward force F2 at the pivot locations P1 (FIG. 3) of the legs and the frame members 50, 52. This upward force F2 lifts the base frame 48 from the ground G so that the stand 100 can be transported without interference. The base frame 48 is spaced a distance d from the ground G. In this particular orientation of FIG. 8, the stand is in the lowered position and unloaded, and the frame arrangement 30 is in a first transport orientation.

When the stand 100 is transported to a first desired location, the brakes 98 of the front wheel arrangement 40 are engaged so that the stand 100 remains in a stationary position during loading. An animal is typically loaded onto the platform 36 from the rear of the stand, and then harnessed or secured to the head harness 78 of the neck reach 76. In some embodiment, a ramp (not shown) can be attached to the rear of the platform to assist in loading the animal.

Figure 9:
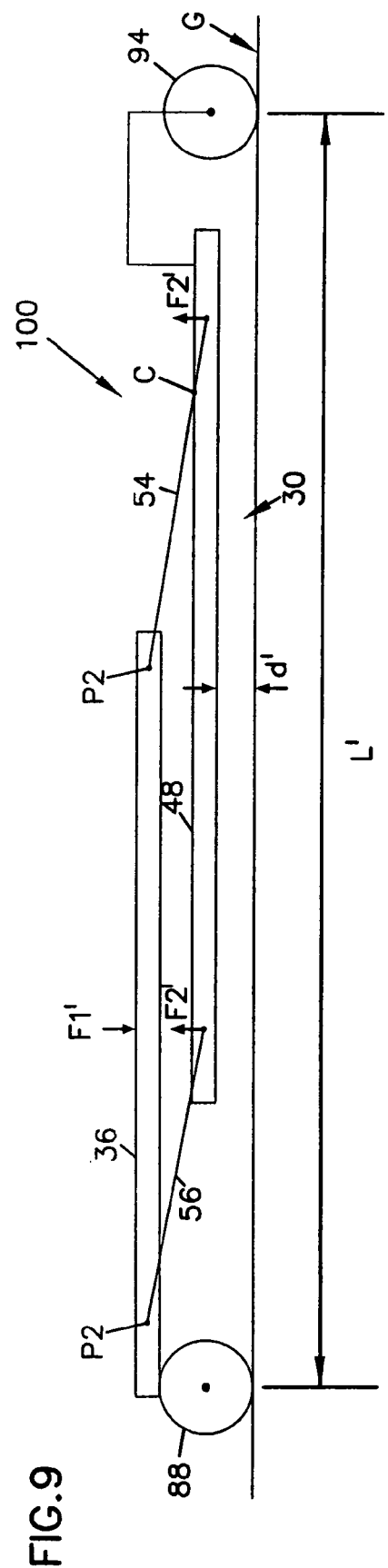
FIG. 9 is a free-body diagram of the stand of FIG. 3, showing the frame arrangement of the fitting stand in a second transport orientation.

When the animal is loaded onto the platform 36, the animal's weight bears down on the platform 36, which in turn places a greater downward force F1' on the pivot locations P2 of the legs 54, 56. The increased downward force F1', and the fulcrum provided by the first cross-support member 66, create an increased, corresponding upward force F2' that raises or lifts the base frame 48 a distance d' even further from the ground G. Because the frame arrangement 30 pivots as a linkage assembly, when the platform 36 is loaded, the overall length of the stand 100 extends from a first length L to a second length L', the second length L' being greater than the first length L. With the base frame 48 raised a distance d' from the ground G, the stand 100 can be transported even while loaded. In this particular orientation of FIG. 9, the stand 100 is in the lowered position and loaded, and the frame arrangement 30 is in a second transport orientation.

Although the illustrated frame arrangement 30 is configured to pivot from a first transport orientation to a second transport orientation, it is contemplated that the stand may includes stops arranged such that the frame arrangement 30 remains in the first transport orientation when an animal is loaded onto the platform 36. In such an alternative arrangement, the stand 100 is configured to transport an animal loaded on the platform in the lowered position, in accord with the principles disclosed.

Figure 5:
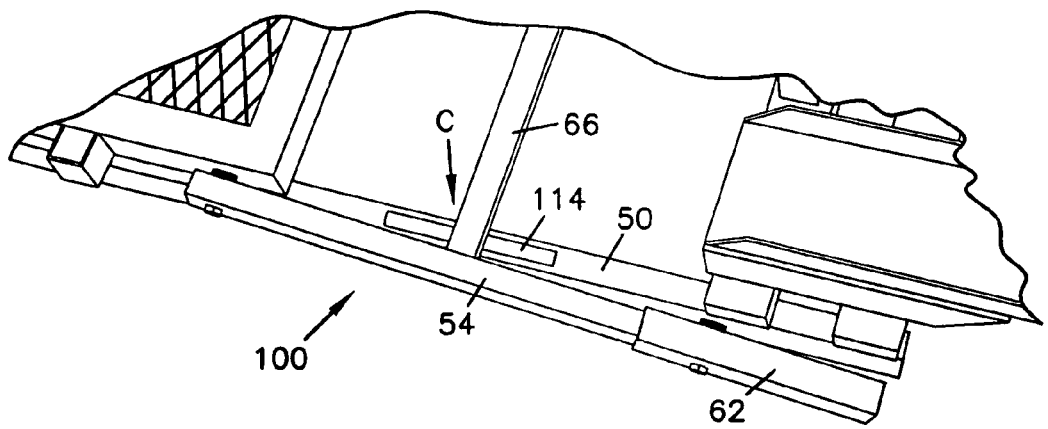
FIG. 5 is a partial perspective view of one embodiment of a frame arrangement of the transport and fitting stand of FIG. 3.

Referring now to FIG. 5, stop structures 114 are located on the first and second frame members 50, 52 of the base frame 48 at the contact points C of the frame arrangement 30. The stop structures 114 provide a space or gap G (FIG. 3) between the first and second frame members 50, 52 and the platform 36 to prevent a user's fingers from becoming pinched between the platform 36 and the base frame 48. The stop structures 114 also strength the structural support of the frame arrangement 30 at the fulcrum. In the illustrated embodiment, the stop structures 114 are rods that are welded to each of the first and second frame members 50, 52.

To transport the loaded stand 100, the brakes 98 of the front wheel assembly 40 are disengaged and the animal is transported on the platform 36 to a desired working location. In conventional arrangements, a user must lead or walk the animal to the location of the stand. That is, a conventional stand cannot be transported to the animal, loaded, and then transported to a different location while the animal is loaded on the stand.

Figure 7:
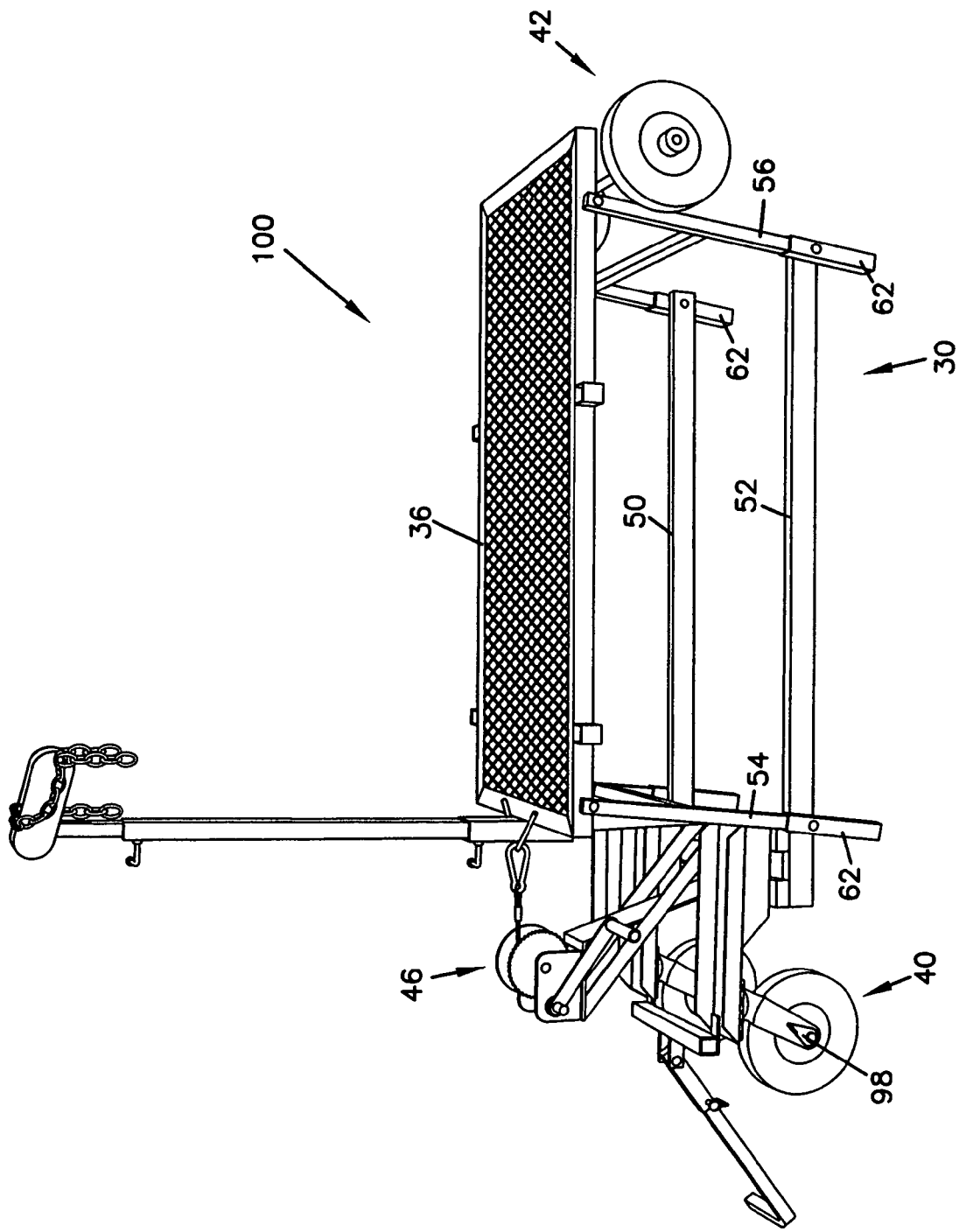
FIG. 7 is another side perspective view of the transport and fitting stand of FIG. 3, shown in a raised position.
Figure 8:
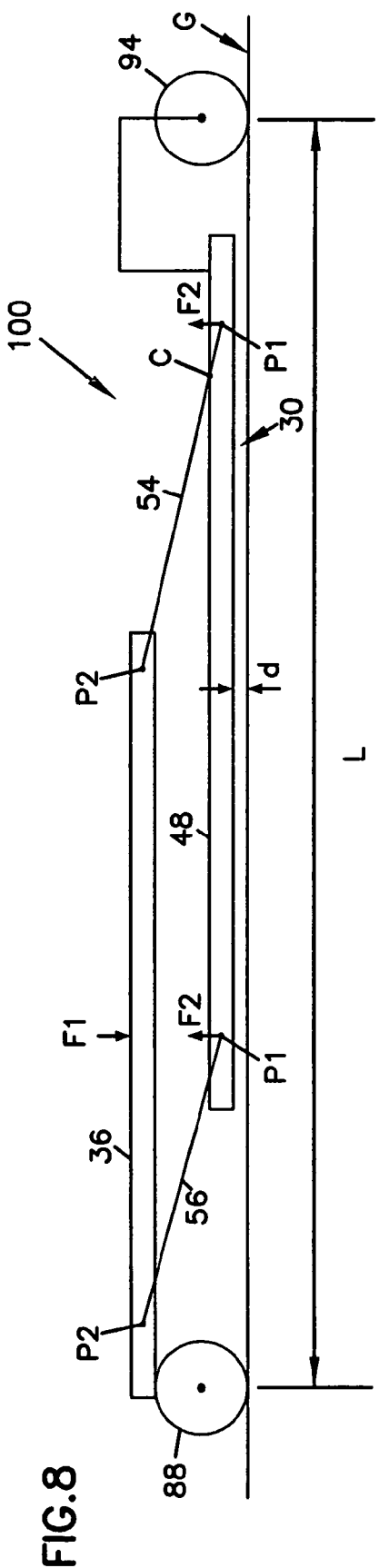
FIG. 8 is a free-body diagram of the stand of FIG. 3, showing a frame arrangement of the fitting stand in a first transport orientation.

Referring now to FIG. 7, to raise the platform 36 of the stand, the power unit 46 is activated to pull the platform to the raised position. Typically the brakes 98 are applied prior to activating the power unit 46 for safety purposes. As the platform 36 is being pulled, the legs 54, 56 of the frame arrangement 30 pivot such that the extensions 62 of the legs contact the ground. The second ends 60 of the legs 54, 56 (i.e. the second ends of the extensions 62) now act a pivot point in relation to the ground to raise the platform 36 to the raised position. The platform 36 remains generally horizontal as the legs 54, 56 pivot to the raised position shown in FIG. 7. In the raised position, each of the front and rear wheel assemblies 40, 42 is lifted off the ground; only the legs 54, 56 contact the ground when the platform is in the raised position.

In the illustrated embodiment, the extensions 62 of the legs 54, 56 extend beyond the base frame 48 a predetermined distance to provide a raised platform height of between 3 inches and 54 inches relative to the ground. In the illustrated embodiment the legs 54, 56 with the extension 62 provide a raised platform height of between 20 inches and 26 inches. Other extension and leg configurations can be used in accord with the principles disclosed to provide different platform heights as needed.

The above specification provides a complete description of the present invention. Since many embodiments of the invention can be made without departing from the spirit and scope of the invention, certain aspects of the invention reside in the claims hereinafter appended.

What is claimed is:

1. A method of using a fitting stand, the fitting stand including a platform coupled to a frame arrangement including pivoting legs and a wheel arrangement, the method comprising the steps of:
    a) loading an animal onto the platform of the fitting stand;
    b) transporting the animal on the platform of the fitting stand to a desired location by utilizing the wheel arrangement and without tilting the platform; and
    c) raising the platform of the fitting stand to a raised position, including:
        i) raising the platform so that the pivoting legs contact the ground; and
        ii) lifting the wheel arrangement from the ground to stabilize the platform in the raised position.

2. The method of claim 1, further including lowering the platform to a lowered position and pivoting the frame arrangement to a transport orientation for transport of the fitting stand.

3. The method of claim 2, wherein pivoting the frame arrangement to the transport orientation for transport of the fitting stand includes transport of the fitting stand with an animal loaded on the platform.

* * * * *